United States Patent [19]
Boyd et al.

[11] Patent Number: 6,016,100
[45] Date of Patent: Jan. 18, 2000

[54] ULTRASONIC ANIMAL DETERRENT FOR PROTECTING AN AREA

[75] Inventors: Randal D. Boyd, Knoxville; Walter J. Frankewich, Jr., Maryville, both of Tenn.

[73] Assignee: Radio Systems Corporation, Knoxville, Tenn.

[21] Appl. No.: 09/111,512

[22] Filed: Jul. 8, 1998

[51] Int. Cl.[7] .............................. G08B 3/10; A01K 15/02
[52] U.S. Cl. ...................... 340/384.2; 340/573.2; 340/573.3; 340/565; 119/712; 119/719; 367/139
[58] Field of Search ....................................... 119/719, 712, 119/713, 786, 788; 340/573.2, 573.3, 566, 565, 384.2; 367/139

[56] References Cited

U.S. PATENT DOCUMENTS

| | | | |
|---|---|---|---|
| 4,689,776 | 8/1987 | Thorndyke et al. | 367/139 |
| 4,987,402 | 1/1991 | Nykerk | 340/565 |
| 5,214,411 | 5/1993 | Herbruck | 340/567 |
| 5,463,595 | 10/1995 | Rodhall et al. | 340/573 |
| 5,501,179 | 3/1996 | Cory | 119/712 |
| 5,627,518 | 5/1997 | Wishart | 340/567 |
| 5,724,919 | 3/1998 | Boyd et al. | 119/719 |
| 5,870,972 | 2/1999 | Zinter et al. | 119/719 |

*Primary Examiner*—Donnie L. Crosland
*Attorney, Agent, or Firm*—Pitts & Brittian, P.C.

[57] ABSTRACT

An animal deterrent system for deterring animal intrusion into a specified area using an oscillating ultrasonic tone. The system includes a weatherproof housing containing an infrared detector for detecting the presence of an animal. To identify relevant intrusions, a count of the number of detections is maintained. After the count reaches predetermined number of infrared signals within a predetermined amount of time, an oscillating ultrasonic deterrent signal is generated to distress the animal and deter intrusion into the protected area. A deterrent timer activates the ultrasonic deterrent for a predetermined amount of time. A mounting stake for deploying the system in remote outdoor locations includes an anti-rotation mechanism, to prevent misalignment as a result of incidental contact.

20 Claims, 6 Drawing Sheets

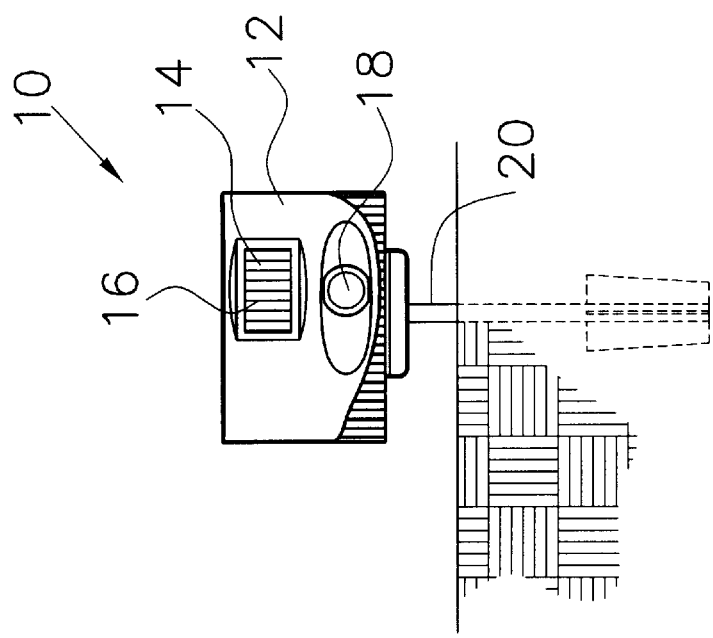
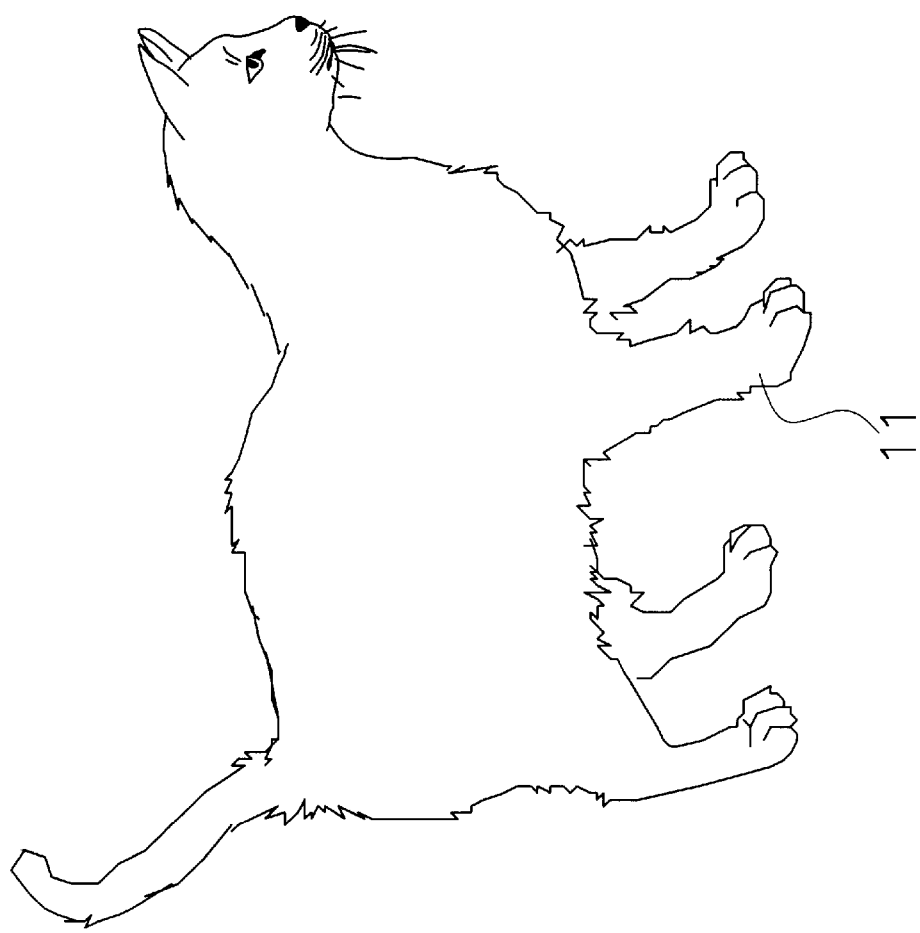
Fig. 1

ULTRASONIC ANIMAL DETERRENT FOR PROTECTING AN AREA

TECHNICAL FIELD

This invention relates to the field of systems for deterring an animal from an area. More specifically, the present invention relates to an animal deterrent system which generates an oscillating frequency ultrasonic pulse and includes circuitry to prevent false triggering.

BACKGROUND ART

Property owners must deal with the possibility of intrusion upon their property by animals. While an animal simply traveling across the property may not be a problem, it can create a nuisance when the intruding animal chooses to dig holes, mark its territory, or dig in trash cans, etc. One possible method of preventing animal intrusion is by erecting a fence or other barrier; however, this is often expensive and may not be aesthetically pleasing or practicable. For example, a property owner may wish to keep animals away from an ornamental garden. Raising a fence is impractical as it obscures the garden and ruins the ornamental effect. Furthermore, the property owner may not need the entire property protected. For example, a property owner may simply need to keep animals out of a trash can.

Another possible method of preventing animal intrusion is through the use of traps or poisons. However, in a residential community where an offending animal is potentially another property owner's pet, this method is unacceptable.

Various animal deterrent systems are presently available. The deterrent stimuli used in presently available animal deterrent systems are typically audible, with the primary difference being the frequency range of the deterrent. Animal deterrent systems having deterrents which are audible in the range of human hearing quickly become a nuisance for the property owner and neighbors alike. These deterrents must be loud enough to sufficiently startle and frighten the animal to be effective as a deterrent. Further, because animal deterrent systems are desired for night time protection the deterrent may be activated during the night. This is unacceptable in many residential neighborhoods where houses are in close proximity.

More common are ultrasonic deterrents which operate at frequencies above the range of human hearing. Typically, animal deterrent systems incorporating an ultrasonic deterrent utilize a single frequency deterrent. While the selected frequency is chosen to have a deterrent effect, the constant frequency can fail to get the attention of the animal. Furthermore, the use of a single frequency does not contemplate variations in the hearing capabilities of the animals, potentially limiting the effectiveness of the animal deterrent system. U.S. Pat. No. 5,724,919 issued to Boyd et al. on Mar. 10, 1998 discloses a hand-held varying-frequency ultrasonic trainer. The '919 device includes a hand-held unit from which a positive or a negative reinforcement sound is generated by pressing the corresponding button. Depressing either button results in one of two audible stimuli which varies over a frequency range. One frequency range is selected to be soothing and the other is selected to be distressing to the animal. The '919 device contains no sensing capabilities, relying upon input from the trainer before applying a reinforcement stimuli. Accordingly, the '919 device is not suited for the continuous monitoring of a particular area as it requires the constant attention of the person operating the hand-held unit to be effective.

Presently available animal deterrent systems incorporate an infrared sensor for detecting the presence of an animal having a body temperature warmer than that of the ambient atmosphere. Typically, these sensors simply react to the presence of such a body. Accordingly, should an animal enter into the range of the sensor, the deterrent will continuously sound while the animal remains within the sensor range. Because a single deterrent pulse has the required deterrent effect, the use of a continuous deterrent places an unnecessary drain on the power supply.

Finally, properly mounting the animal deterrent system in isolated, outdoor locations is crucial for maintaining protection of the desired area. One method for mounting presently available animal deterrent systems in an isolated outdoor location is a stake which can be driven into the ground, for example in a garden. The stake is typically a rounded peg which supports the sensor unit. However, animal deterrent systems incorporating a rounded peg are subject to misalignment caused by environmental factors, such as wind and rain, or incidental contact. Such misalignment often renders the animal deterrent ineffective as it is no longer oriented to "watch" the protected area. Similarly, variations in the flora and the terrain surrounding the area to be protected affect the range at which the animal deterrent system operates, requiring the sensor unit to be mounted at various heights to compensate.

Accordingly, there is a need for an animal deterrent system which incorporates an ultrasonic deterrent of varying frequency to deter animals from a specific area. Further, there is a need for an animal deterrent system which can detect the motion of an animal and initiate a single deterrent pulse periodically until the animal leaves the sensor range. Finally, there is a need for an animal deterrent system which is capable of maintaining a desired orientation when mounted in an isolated, outdoor location.

Therefore, it is an object of the present invention to provide an animal deterrent system capable of generating an ultrasonic deterrent stimulus for deterring an animal from a protected area.

It is a further object of the present invention to provide an ultrasonic deterrent which oscillates over a specified frequency range for obtaining the attention of the target animal and increasing the effectiveness of the deterrent among various animals.

A still further object of the present invention is to provide an animal deterrent system which detects an animal within the sensor range and generates a single deterrent stimulus when the detection count exceeds a specified number within a predetermined amount of time, thereby preventing false trigger of the unit.

Yet another object of the present invention is to provide an animal deterrent system which can be securely mounted in an isolated, outdoor location so as to maintain the desired orientation of the sensor unit independent of environmental conditions or incidental contact.

Another object of the present invention is to provide an animal deterrent system which can be mounted at various heights at an isolated, outdoor location to vary the range of protection and accommodate variations in flora and terrain.

DISCLOSURE OF THE INVENTION

The present invention incorporates an animal deterrent system for protecting a specified area. The system includes a weatherproof housing containing an infrared detector for detecting objects having a body temperature greater than that of the ambient temperature. The detector is mounted behind a sensor cover which is infrared-transparent. The sensor cover defines a series of graduations which are used to detect the movement of the animal through the sensor field. When the heat source is detected by the infrared detector, a detection signal is summed by a counter. After a predetermined number of infrared signals have been counted within a predetermined amount of time, the system generates a deterrent signal which includes an ultrasonic tone varied by an oscillator over a frequency range which is distressing to the animal. Furthermore, the system activates a timer which activates the ultrasonic tone for a predetermined amount of time.

The system is designed for indoor or outdoor use and can be equipped with either a replaceable power source, such as a battery, or an adapter for receiving power from an external source, such as a wall outlet.

Furthermore, the system can be mounted in various ways depending upon the location which is to be protected. The sensor unit housing defines a mounting mechanism for securing the sensor unit to a wall or fence.

Alternatively, the sensor unit can be deployed using a mounting member. The mounting member includes a least a base ember having a first end configured for being secured in the ground and a second end configured for connection to the housing. The mounting member may optionally include an extension member. To prevent misalignment as a result of incidental contact, the mounting member includes an anti-rotation mechanism to inhibit the mounting member from rotating within the hole in which it rests.

BRIEF DESCRIPTION OF THE DRAWINGS

The above-mentioned features of the invention will become more clearly understood from the following detailed description of the invention read together with the drawings in which:

FIG. 1 is a schematic illustration of an animal deterrent system incorporating various features of the present invention;

BEST MODE FOR CARRYING OUT THE INVENTION

Figure 2:
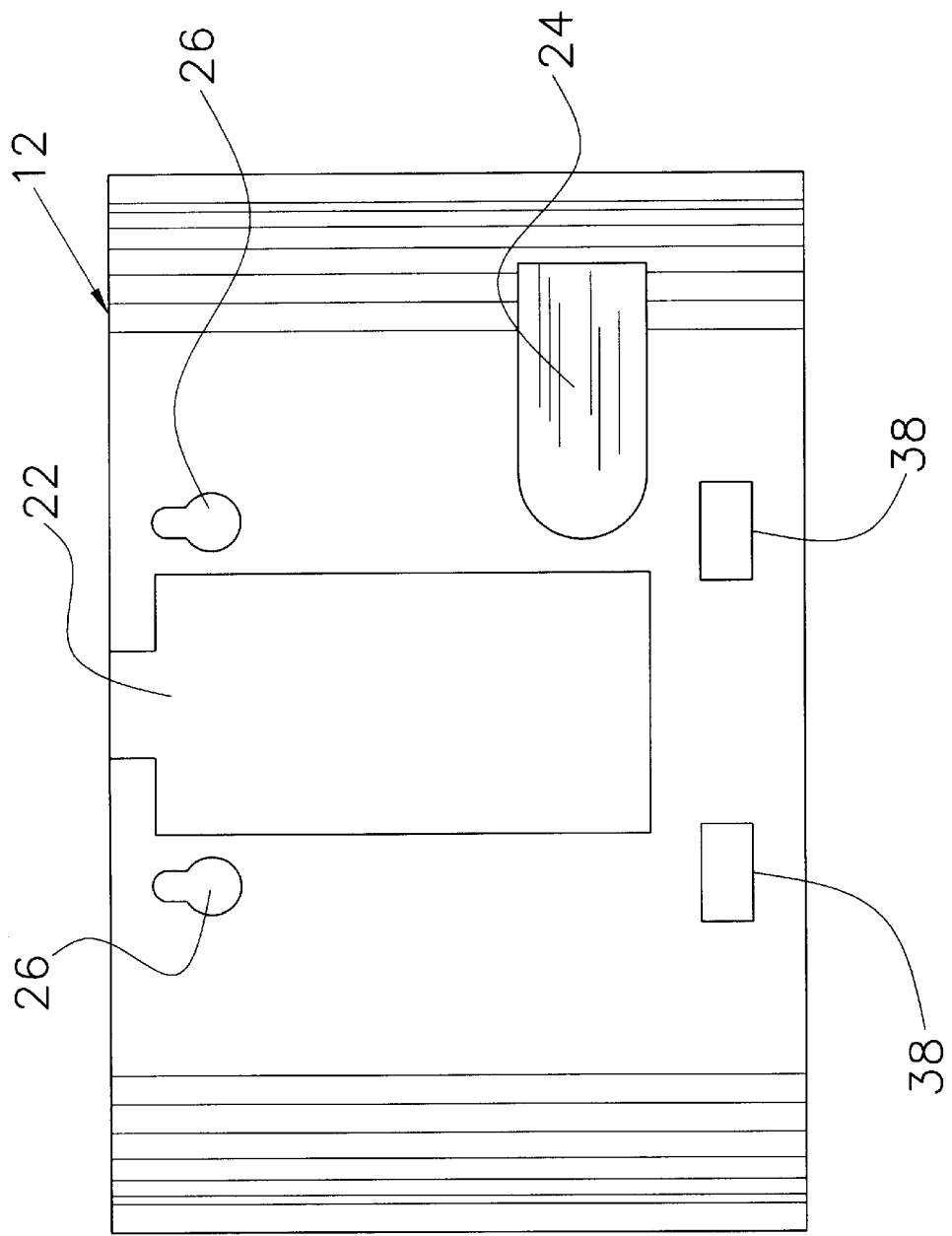
FIG. 2 illustrates a rear elevation view of the sensor unit of the present invention.

An animal deterrent system for protecting a specified area is illustrated generally at 10 in the figures. FIG. 1 illustrates the animal deterrent system 10 in operation. The pet deterrent system includes a weatherproof housing 12 containing a detector (not shown), disposed behind a sensor cover 14, and an audio output device 18. In the illustrated embodiment, the housing 12 is mounted on a mounting device 20. Additionally, in the illustrated embodiment, the detector is an infrared detector for detecting objects having a body temperature greater than that of the ambient temperature. In order to accomplish this, the sensor cover 14 is infrared-transparent. One skilled in the art will recognize that other detectors can be used.

In the illustrated embodiment, the audio output device 18 is a piezoelectric device configured to deliver an ultrasonic frequency. The sensor cover 14 defines a plurality of facets 16 which isolate the location of the animal 11 within the field of detection. As the animal 11 moves across the detection field, the facets break-up the infrared heat emitted from the animal 11 into an distinct infrared signal related to the position of the animal 11 within the sensor field. When a predetermined number of infrared signals are detected by the infrared detector (not shown) within a predetermined amount of time, the audio output device 18 produces a deterrent stimulus to deter the animal 11 from entering into the protected area.

FIG. 2 illustrates the rear of the housing 12. Visible are a battery cover 22, an adapter receptor 24 for receiving a.c. or d.c. power, a mounting mechanism 26, and at least one tab lock receptacle 38. In the illustrated embodiment, the mounting mechanism 26 is a pair of slotted receptors configured to receive the head of a nail or a screw. One skilled in the art will recognize that other mounting mechanisms can be used. Further, one skilled in the art will recognize that either of the battery cover 22 or the adapter connector 24 can be omitted without interfering with the function or purpose of the device.

Figure 3:
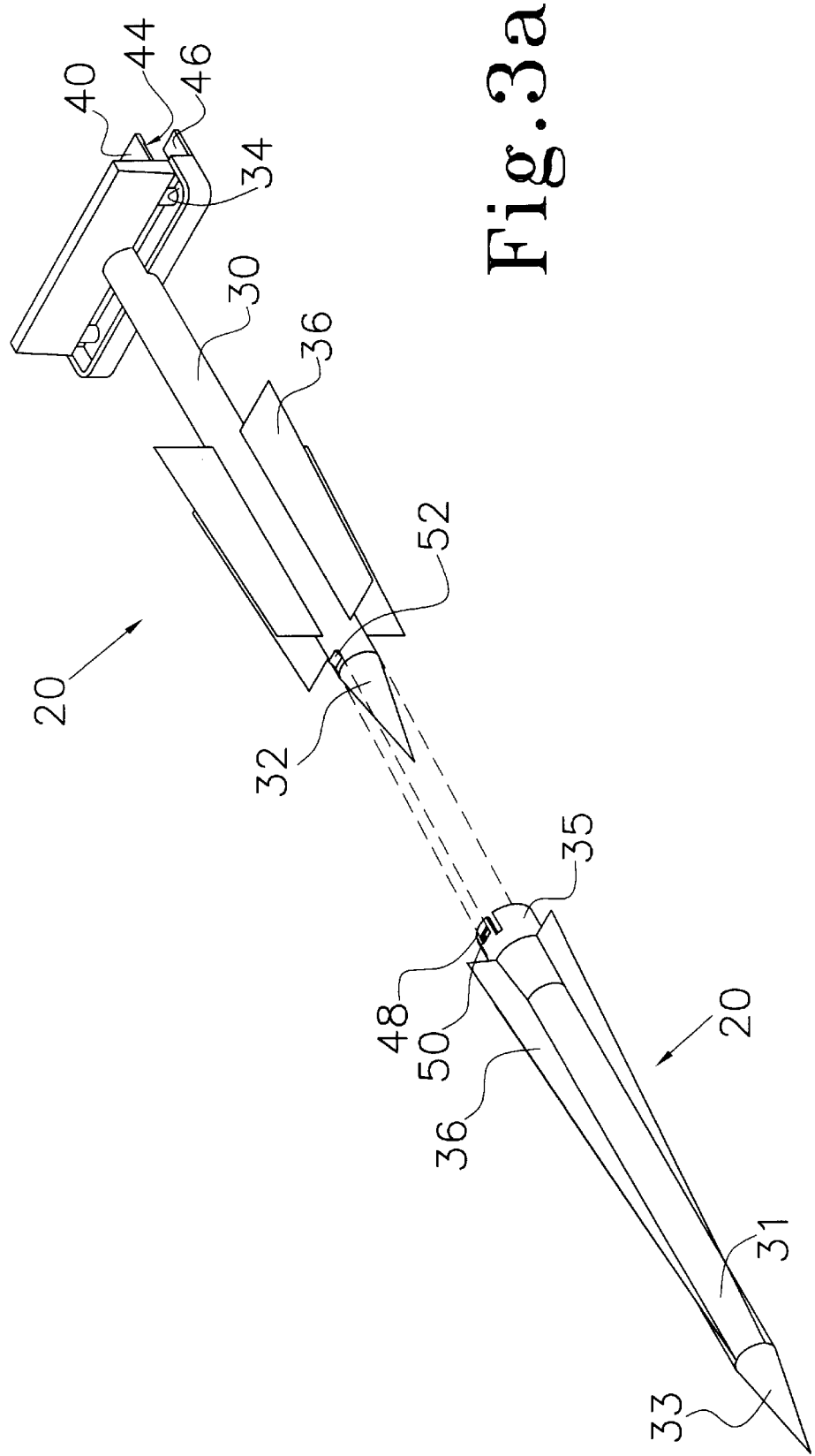
FIG. 3a illustrates a perspective view of the base member of the mounting device of the present invention.
FIG. 3b illustrates a perspective view of the extension member of the mounting device of the present invention.
Figure 4:
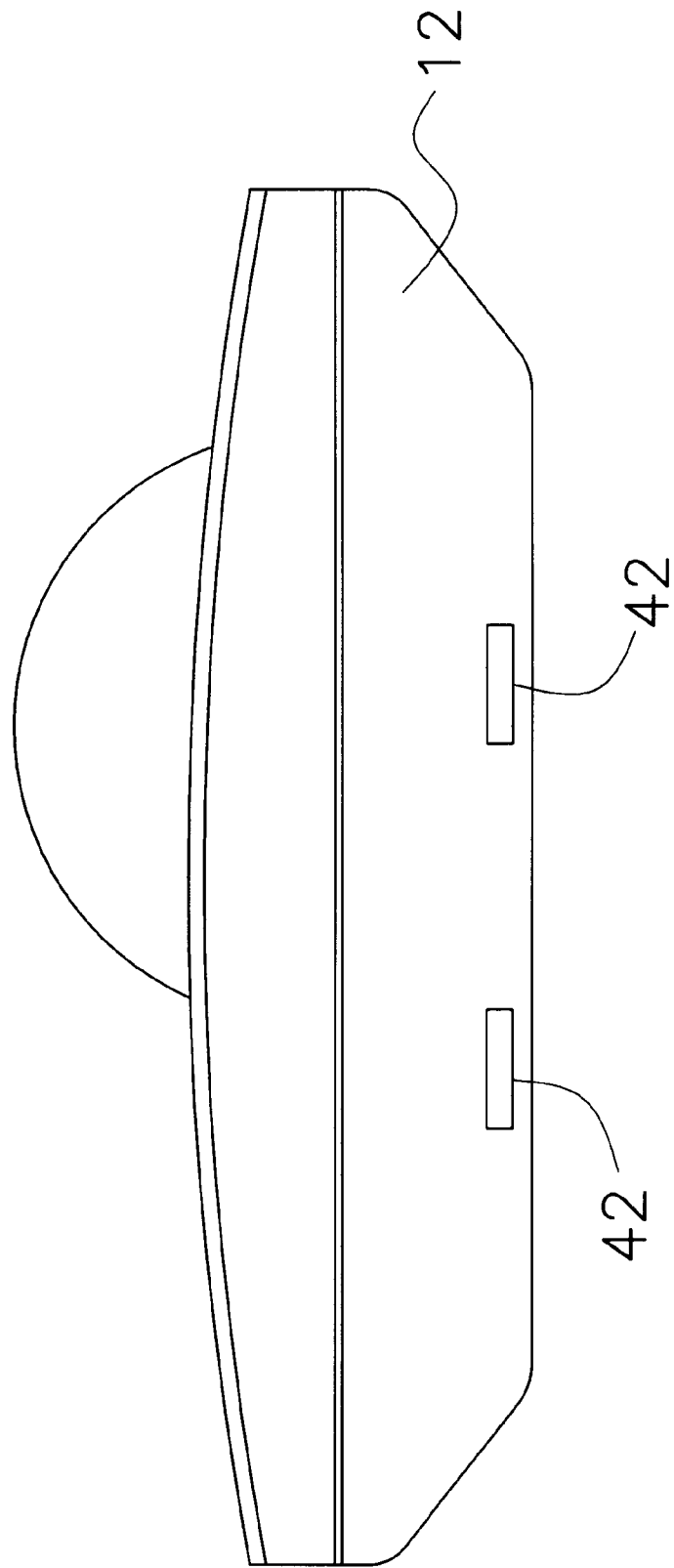
FIG. 4 illustrates a bottom plan view of the sensor unit of the present invention.

Referring now to FIG. 3, one embodiment of the mounting device 20 is shown in detail. FIG. 3a illustrates a base member 30 having a first end 32 configured for being secured in the ground and a second end 34 configured for connection to the housing 12. The second end 34 of the base member 30 is configured to be attached to the housing 12. In the illustrated embodiment, the second end 34 of the base member 30 includes at least one tab 40 to be received by the at least one slot 42 of the housing 12, as shown in FIG. 4. The tab 40 further defines a lip 44 which engages the tab lock receptacle 38 (see FIG. 2), thereby securing the tab 40 in the slot 42. At least one retaining tab 46 is offset from the tab 40 to engage the back of the housing 12 and bias the housing 12 toward the tab 40, further securing the lip 44 within the tab lock receptacle 38. One skilled in the art will recognize that other configurations can be used to connect the base member 30 to the housing 12 without interfering with the objects or function of the present invention.

FIG. 3b illustrates an extension member 31 are shown for permitting variations in the mounting height of the animal deterrent system 10. The second end 35 of the extension member 31 is configured to receive the first end 32 of the base member 30 to lengthen the mounting device 20. In the illustrated embodiment, the extension member 31 defines at least one linking tab 48 defining a slot 50 for receiving a tab 52 defined by the base member 30. One skilled in the art will recognize that other linking assemblies can be used to interlock multiple elongated members. Further, one skilled in the art will recognize that the number and length of the elongated members can vary without interfering with the objects or function of the present invention.

In the illustrated embodiment, the base member 30 and the extension member 31 generally have a circular cross-section with each first end 32, 33 having a conical shape. One skilled in the art will recognize that other shapes could be used for the base member 30 and the extension member 31 without interfering the function or purpose of the animal deterrent system 10.

Because the cross section of the base member 30 and the extension member 31 are generally circular, incidental contact such as from a strong wind can cause the animal deterrent system 10 to become misaligned due to rotation. Accordingly, each of the base member 30 and the extension member 31 includes an anti-rotation mechanism 36 for preventing the base member 30 and the extension member 31 from rotating within the hole in which they rests. In the illustrated embodiment, the anti-rotation mechanism 36 includes four vanes extending radially from the exterior surface of the base member 30. One skilled in the art will recognize that other numbers of and positions for the vane or vanes can be used to achieve the intended purpose.

Figure 5:
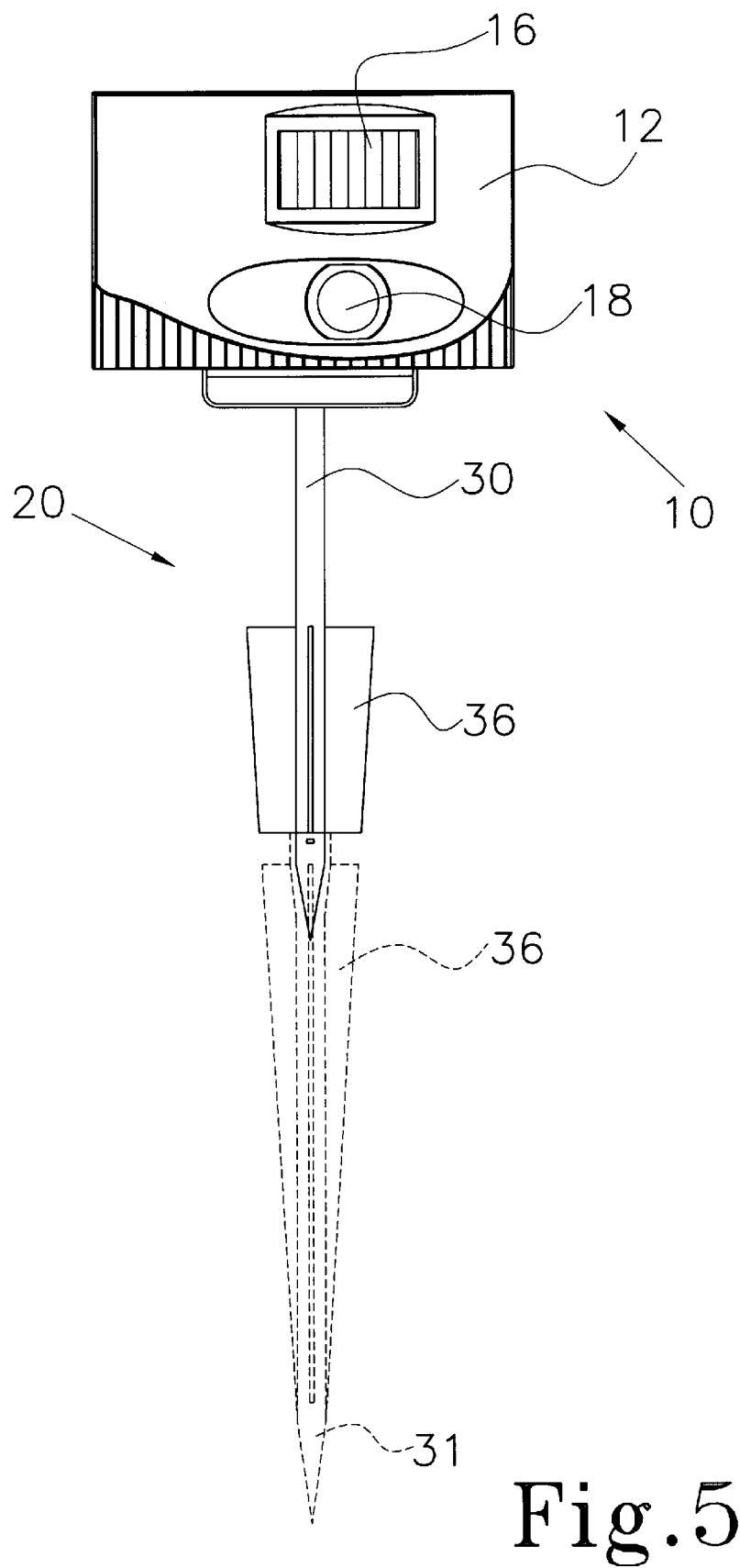
FIG. 5 illustrates a front elevation view of the animal deterrent system incorporating various features of the present invention.

FIG. 5 illustrates the animal deterrent system 10 having a mounting stake 20 including the both the base member 30 and extension member 31 in the interlocked position to increase the mounting height with the extension member 31 being shown in phantom.

Figure 6:
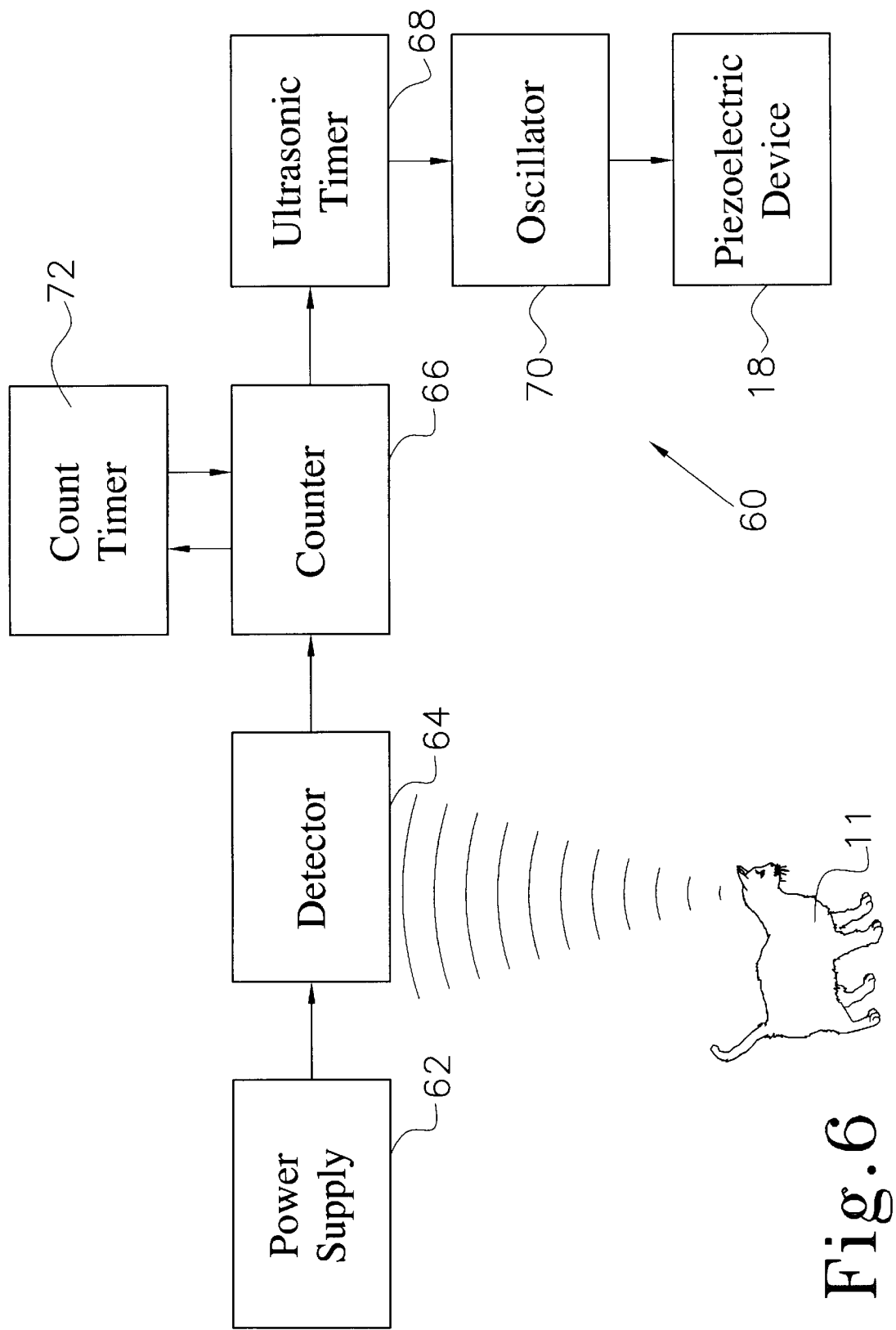
FIG. 6 illustrates a block diagram of the circuit of the animal deterrent system of the present invention.

FIG. 6 illustrates a block diagram of the animal deterrent system circuit 60. The circuit 60 includes a power supply 62 which supplies power to the animal deterrent system 10. In the illustrated embodiment, the power supply 62 is a battery for facilitating outdoor use. One skilled in the art will recognize that other types of power supplies can be used.

When the animal 11 enters the sensor range of a detector 64, a detection signal is generated. A counter 66 counts each detection signal. The first detection signal counted starts the count timer 72. A predetermined amount of signals must be detected within a predetermined amount of time for the counter to generate an initialization signal. When an insufficient number of detection signals are counted during the time limit, the counter 66 is reset and the sequence starts again. However, after a specified number of detection signals have been counted, the counter 66 generates a deterrent initialization signal. The deterrent initialization signal activates a timer 68 which activates the ultrasonic tone for a predetermined amount of time, thereby creating a delay between each deterrent. In the illustrated embodiment, the timer 68 is a monostable multivibrator used as a "one-shot". Simultaneously, the deterrent initialization signal activates an oscillator 70 which produces a signal of varying frequency which is converted into an ultrasonic wave by the piezoelectric device 18. By varying the frequency over a range, optimum operation of the piezoelectric device 18 is obtained. Furthermore, varying the frequency of the ultrasonic pulse is found to be more distressing to the animal 11 and minimizes the ability of the animal 11 to become accustomed to the deterrent signal.

The present invention provides an ultrasonic animal deterrent having multiple ways for mounting including a mounting stake designed not to rotate within the ground. The infrared detector, in conjunction with a faceted sensor cover, receives infrared signals from an animal within the sensor range. After a predetermined number of infrared signals have been counted, an oscillating frequency ultrasonic signal is emitted from a piezoelectric device to distress the animal and deter it from entering the protected area.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, We claim:

1. An animal deterrent system for frightening an animal away from a protected area, said animal deterrent system including:

a detector for detecting an external signal, said external signal representing an animal, said external signal being continuous;

a detection signal generator responsive to said detector for generating a detection signal;

a counter responsive to said detection signal for counting at least one said detection signal;

a count timer for timing a summation period, said summation period being a period of time for counting said at least one detection signal;

a deterrent signal generator responsive to said counter for generating a deterrent initialization signal after a number of said detection signals have been counted within said summation period;

an output device responsive to said deterrent initialization signal for delivering a deterrent stimulus;

a deterrent timer responsive to said deterrent initialization signal for activating said output device for a predetermined amount of time, thereby creating a delay between each said deterrent stimulus;

a sensor unit housing for containing said detector, said counter, said detection signal generator, said deterrent signal generator, said output device, said count timer, and said deterrent timer; and a detector cover for passing said external signal to said detector through said sensor unit housing.

2. The animal deterrent system of claim 1 wherein said sensor unit housing defines at least one slotted receptor for receiving a head of a screw or a nail.

3. The animal deterrent system of claim 1 wherein said animal deterrent system includes a base member for mounting said sensor unit housing, said base member having a first end configured to be inserted into the ground and a second end configured to be releasably secured to said sensor unit housing.

4. The animal deterrent system of claim 3 wherein said base member includes an anti-rotation mechanism being configured to maintain a selected orientation in the ground.

5. The animal deterrent system of claim 4 wherein said anti-rotation mechanism includes at least one vane extending radially from said base member.

6. The animal deterrent system of claim 3 wherein said animal deterrent system includes at least one extension member for extending said base member, said at least one extension member having a first end configured to be inserted into the ground and a second end configured to be releasably secured to said base member.

7. The animal deterrent system of claim 6 wherein said at least one extension member includes an anti-rotation mechanism being configured to maintain a selected orientation in the ground.

8. The animal deterrent system of claim 7 wherein said anti-rotation mechanism includes at least one vane extending radially from said extension member.

9. The animal deterrent system of claim 1 wherein said output device is a piezoelectric device configured to generate an ultrasonic stimulus.

10. The animal deterrent system of claim 1 wherein said animal deterrent system includes an oscillator disposed within said sensor unit housing for varying said ultrasonic deterrent stimulus over a frequency range.

11. The animal deterrent system of claim 1 wherein said detector is an infrared detector capable of distinguishing objects having temperatures greater than that of the ambient temperature.

12. The animal deterrent system of claim 1 wherein said detector cover is infrared transparent.

13. The animal deterrent system of claim 1 wherein said detector cover defines a plurality of facets for dividing said external signal into a plurality of divided signals, each of said plurality of divided signals being treated by said detector as said external signal.

14. An animal deterrent system for frightening an animal away from a protected area, said animal deterrent system including:
- a detector for detecting an external signal, said external signal representing an animal, said external signal being continuous;
- a detection signal generator responsive to said detector for generating a detection signal;
- a counter responsive to said detection signal for counting at least one said detection signal;
- a count timer for timing a summation period, said summation period being a period of time for counting said at least one detection signal;
- a deterrent signal generator responsive to said counter for generating a deterrent initialization signal after a number of said detection signals have been counted within said summation period;
- an output device responsive to said deterrent initialization signal for delivering a deterrent stimulus, said deterrent stimulus being an ultrasonic tone, said output device being a piezoelectric device configured to deliver said ultrasonic tone;
- an oscillator for varying said deterrent stimulus over a frequency range;
- a deterrent timer responsive to said deterrent initialization signal for activating the ultrasonic tone for a predetermined amount of time, thereby creating a delay between each said deterrent stimulus;
- a sensor unit housing for containing said detector, said counter, said detection signal generator, said deterrent signal generator, said output device, said oscillator, said count timer, and said deterrent timer;
- a detector cover for passing said external signal to said detector through said sensor unit housing, said detector cover defining a plurality of facets for dividing said external signal into a plurality of divided signals, each of said plurality of divided signals being being treated by said detector as said external signal, said detector cover being infrared transparent; and
- a base member having a first end configured to be inserted into the ground and a second end configured to be releasably secured to said sensor unit housing; said base member including an anti-rotation mechanism being configured to maintain a selected orientation in the ground, said anti-rotation mechanism including at least one vane extending radially from said base member.

15. The animal deterrent system of claim 14 wherein said animal deterrent system includes at least one extension member for extending said base member, said at least one extension member having a first end configured to be inserted into the ground and a second end configured to be releasably secured to said base member, said extension member includes an anti-rotation mechanism being configured to maintain a selected orientation in the ground, said anti-rotation mechanism including at least one vane extending radially from said extension member.

16. The animal deterrent system of claim 14 wherein said sensor unit housing defines at least one slotted receptor for receiving a head of a screw or a nail.

17. A method for deterring an animal from entering a protected area, said method including the steps of:
  (a) dividing an external signal representing an animal into a plurality of divided signals;
  (b) detecting each of said plurality of divided signals;
  (c) generating a detection signal;
  (d) timing a summation period, said summation period having a predetermined length of time;
  (e) counting said detection signal;
  (f) generating a deterrent initialization signal after a predetermined number of said detection signals have been counted within said summation period; and
  (g) generating a deterrent stimulus after said deterrent initialization signal is generated.

18. The method of claim 17 wherein said step of detecting includes detecting an object having a temperature greater than an ambient temperature.

19. The method of claim 17 wherein said step of generating a deterrent stimulus includes generating an ultrasonic pulse.

20. The method of claim 17 wherein said step of generating a deterrent stimulus further includes generating an oscillation for producing said ultrasonic pulse at varying frequencies.

* * * * *